June 28, 1960
A. H. ROSENTHAL
2,943,315
LIGHT-MODULATOR DISPLAY MEANS
Filed March 9, 1954
2 Sheets-Sheet 1
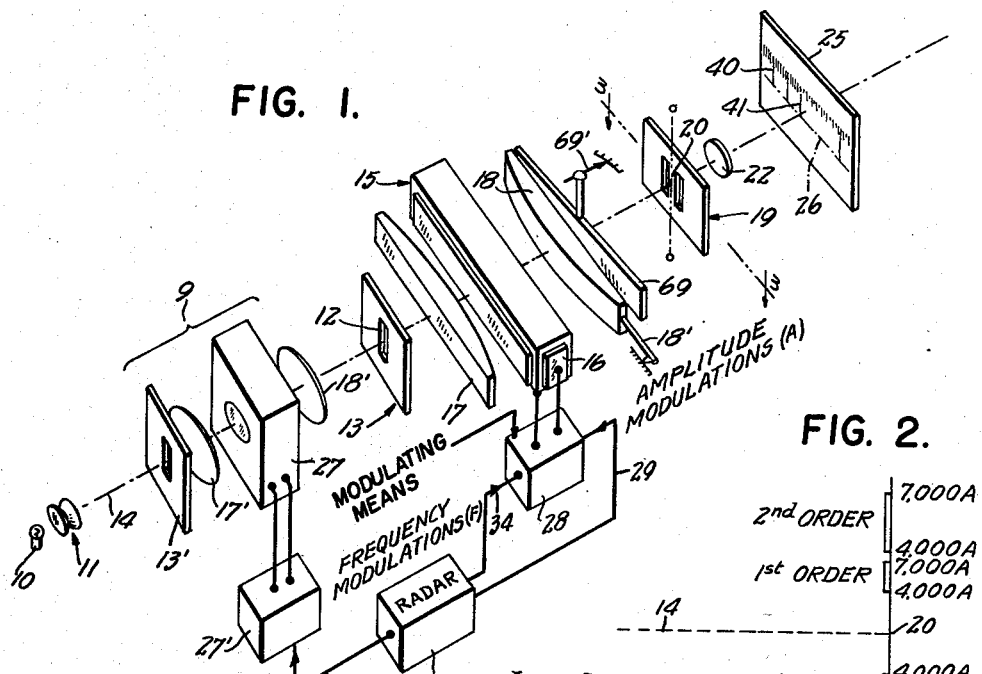
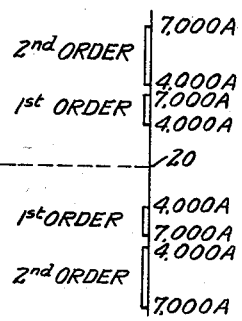
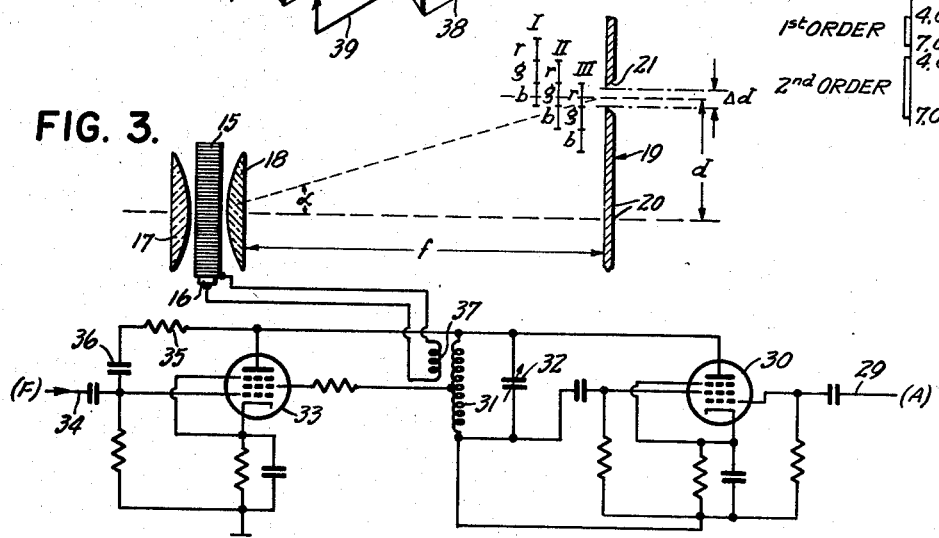
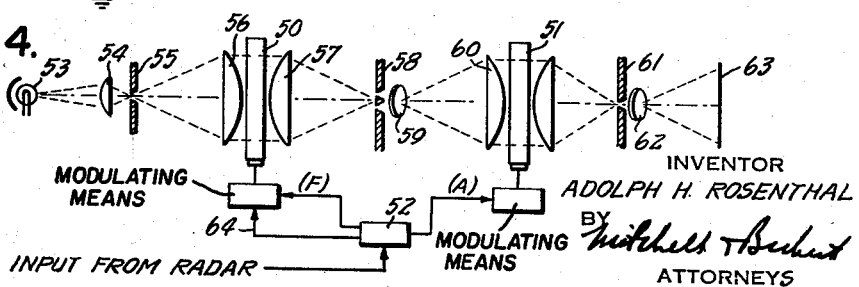
INVENTOR
ADOLPH H. ROSENTHAL
BY
ATTORNEYS June 28, 1960   A. H. ROSENTHAL   2,943,315
LIGHT-MODULATOR DISPLAY MEANS
Filed March 9, 1954   2 Sheets-Sheet 2
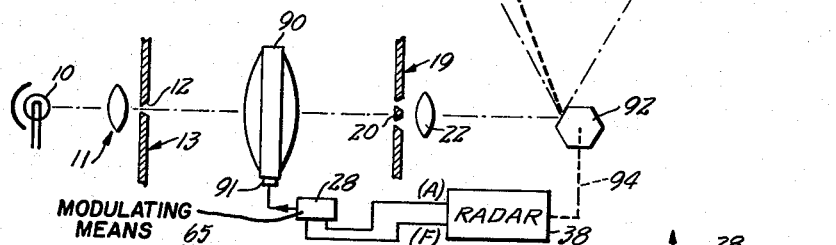
FIG. 5.
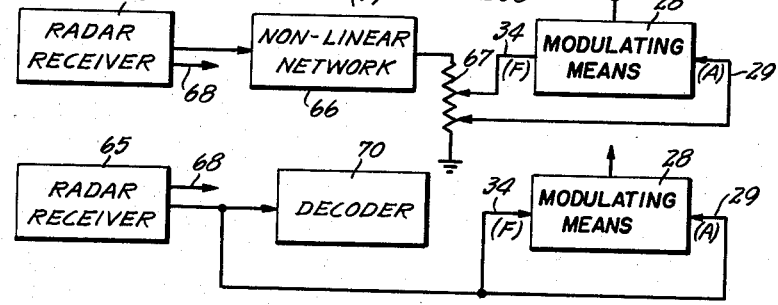
FIG. 6.
FIG. 7.
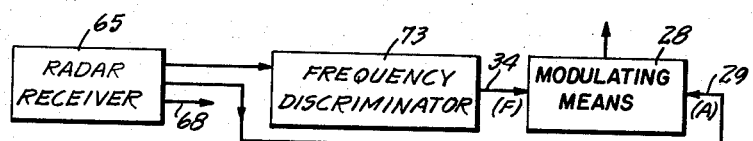
FIG. 8.
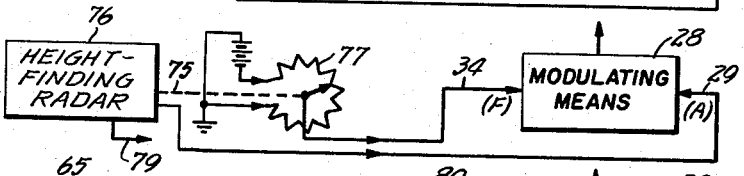
FIG. 9.
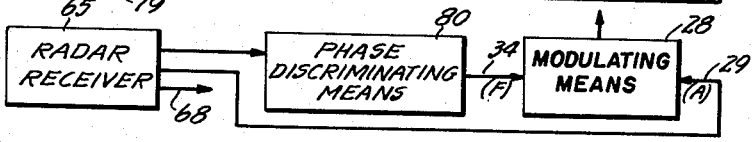
FIG. 10.
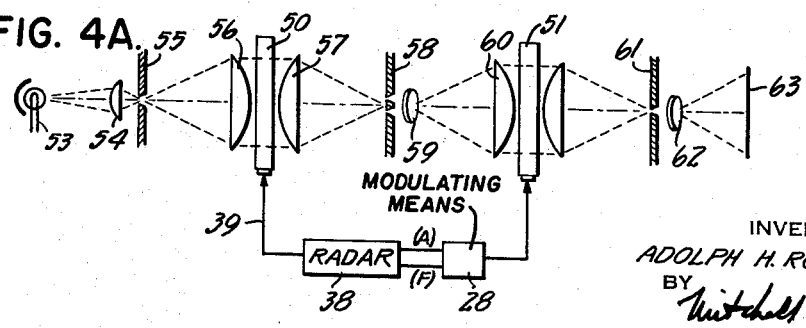
FIG. 4A.
INVENTOR
ADOLPH H. ROSENTHAL
BY
ATTORNEYS United States Patent Office 2,943,315
Patented June 28, 1960

2,943,315
LIGHT-MODULATOR DISPLAY MEANS

Adolph H. Rosenthal, Forest Hills, N.Y., assignor to Fairchild Camera and Instrument Corporation, Syosset, N.Y., a corporation of Delaware Filed Mar. 9, 1954, Ser. No. 415,055

16 Claims. (Cl. 343—17)

This invention relates to color-display means and incorporates improvements over the disclosure in my Patent No. 2,513,520, issued July 4, 1950. The present application is a continuation-in-part of my copending application Serial No. 217,104, filed March 23, 1951, now Patent No. 2,807,799.

It is an object of the invention to provide improved means whereby color can be controlled by means of a light-modulating device of the ultrasonic-cell type.

Another object is to provide improved display means incorporating color modulation.

It is also an object to provide improved display means incorporating intensity modulation and color modulation.

It is a specific object to provide color-modulating means of the ultrasonic-cell type for radar, oscillographic, and other time-based or otherwise-based display of detected phenomena.

Another specific object is to provide means for storing in an electro-optical display device, for short intervals, a plurality of observed parameters as a function of the same time base and for effectively projecting the stored data in a single presentation covering the full or a selected part of said time base, one of the parameters appearing as an intensity or brightness modulation and the other as a color modulation over said time base.

It is a further specific object to provide means for effectively instantaneously sampling a delay line which has been impressed with amplitude-modulated and frequency-modulated data and for optically displaying, from such sampling, an intensity or brightness modulation and a color modulation over a common time scale representing transit time along said delay line.

It is a general object to achieve the above objects with apparatus of relative simplicity, involving virtually no further parts than those employed in analogous black-and-white displays.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified isometric diagram, schematically showing optical elements of a display means incorporating features of the invention;

Fig. 2 is a simplified diagram to explain the functioning of a part of the apparatus of Fig. 1;

Fig. 3 is a circuit diagram of control means for the apparatus of Fig. 1, certain of the optical parts of Fig. 1 being shown enlarged and in a section through the plane 3—3 of Fig. 1;

Figs. 4, 4A and 5 are simplified diagrams of alternative display means of the invention; and Figs. 6 to 10 are block diagrams of various radar applications of the display means of the invention.

The scientific basis of ultrasonic color modulation is inherent in the diffraction theory of the ultrasonic cell; this theory has been discussed at length in the literature, and therefore will be treated here only as far as necessary for the color aspects. In the schematic of Fig. 1, there is shown a color modulator on an optical axis 14. In this modulator, white or substantially panchromatic light from a source 10 passes through a condenser-lens system 11 and shutter means 9 (in a manner and for a purpose to be later described) to a diaphragm 13 having a slit 12 formed therein. The light passing this slit 12 is collimated, or made parallel, by a lens 17 and traverses as parallel beams the ultrasonic cell 15; thereafter, the light is concentrated by lens 18 upon the diaphragm 19. In other words, the optical system consisting of the two lenses 17 and 18, and of the ultrasonic cell 15, forms at 20 an image of the slit 12 in diaphragm 13 upon the plane of diaphragm 19. When the crystal 16 is excited, ultrasonic waves will be produced in the liquid of the cell 15, and these waves will diffract the parallel beams from their original direction; a number of diffraction spectra will then be formed upon the plane of diaphragm 19, to each side of the center 20 of this diaphragm, or to each side of the original slit image. Each of these diffraction spectra constitutes a separation of the light from source 10 into its component colors.

In past applications of the ultrasonic light modulator, the slit 12 of diaphragm 13 has usually been made so wide that the color spectra belonging to individual surface parts of this slit opening overlapped in the plane of diaphragm 19 in such a way as to produce substantially white light thereon. In other words, the inherent spectral resolution of the ultrasonic diffraction grating was not utilized, because the main problem was to obtain a maximum of black-and-white light modulation. By making the slit opening 12 in the diaphragm 13 sufficiently narrow, true color-diffraction spectra can be produced at the plane of diaphragm 19.

The position of such color-diffraction spectra is shown in Fig. 2, where 14 is the optical axis and 20 indicates the central position on diaphragm 19, as in Fig. 1. On the plane of diaphragm 19 are shown the first and second-order spectra on each side of the central position 20; the approximate relative positions of wave-lengths, from the violet end (at 4000 Angstrom units) to the red end (at 7000 A.) are indicated.

Fig. 3 will serve to illustrate the color-diffraction phenomenon with greater detail. In Fig. 3, the position of one of the first-order spectra is schematically indicated in front of the diaphragm 19, and the positions of the colors blue, green, and red for a particular diffraction condition are indicated by the letters $b$, $g$, $r$, respectively. Since the placement of particular colors is proportional to the wavelengths of these colors, red will be further displaced than green and blue, for a given diffraction condition; three such diffraction conditions are depicted at I, II, and III. By arranging a slit opening 21 (in diaphragm 19) at a distance $d$ from the central position 20, and, depending upon the placement of this slit opening with respect to the center 20 for given diffraction conditions, any particular color can be made to pass the opening 21, the other colors being stopped by the diaphragm 19. The device may thus act as a spectroscopic monochromator of selectable wavelength.

Referring again to Fig. 3, it will be seen that one may predict the conditions under which a particular color of wavelength $\lambda$ will be positioned at a distance $d$ from the center 20 of the diaphragm 19; thus, from the theory of ultrasonic-light diffractions—

$$d = f\frac{\lambda N}{v} \tag{1}$$

where $f$ is the focal length of the lens 18, or the distance of this lens to the diaphragm 19, $\lambda$ is the wavelength of the light, $N$ is the carrier frequency of the modulation impressed upon the crystal 16, and $v$ is the velocity of the ultrasonic waves in the liquid of the cell. Importantly, it will be noted from Expression 1 that the displacement of any particular color is proportional both to the wavelength $\lambda$ of this color, and to the ultrasonic carrier frequency N, that is, to the frequency of the electric oscillations impressed upon the crystal 16. Therefore, for any given position of the slits 21 in the diaphragm 19 (i.e., for any given value of $d$), the wavelength of the light which can pass through these slit openings 21 is inversely proportional to the ultrasonic frequency N (i.e., to the electric crystal-exciting frequency), in accordance with the following expression (derived from Expression 1 above):

$$\lambda = \frac{vd}{f} \frac{1}{N} \quad (2)$$

Thus, the wavelength, that is the color of the light transmitted through the diaphragm 19, can be completely controlled by the frequency N of the electric oscillations impressed upon the crystal 16; by varying this frequency N, the diffraction spectrum may be caused to shift across the slit opening 21 on diaphragm 19, so that any desired color can be made to pass the diaphragm 19.

According to previously described principles of ultrasonic light modulation, light intensity, that is, the intensity of the light (of a given color), is substantially proportional to the intensity or power of the electric oscillations impressed upon the crystal 16. Thus, the intensity of the controlled light may be governed by an amplitude modulation of the signal impressed on crystal 16, while, at the same time, in accordance with the invention, the color of the controlled light may be governed by a frequency modulation.

Briefly stated, the invention contemplates novel means for utilizing various combinations of these independent modulating means to control the intensity and color of light in a given display system. Stated in other words, the invention may permit the display of two independent variables characterizing a given phenomenon, by employment of the two parameters of light transmitted by diaphragm 19, namely, its intensity and its color. In one specific form to be described, two independent variables may be employed in the amplitude and frequency modulation of the crystal of a single ultrasonic cell; in an alternate form, separate cells, separately frequency-modulated and amplitude-modulated, may be employed in a single optical system. Regardless of the modulating means, the light issuing from the diaphragm 19 can be utilized in any desired manner, as by employing an objective lens 22 to form an image of the ultrasonic-cell modulations on a screen or on color-responsive film, such as Kodachrome, Ansco color, or the like.

In the arrangement of Fig. 1, the single cell 15 may be subjected simultaneously to amplitude modulations and to frequency modulations to correspondingly control the relative intensity and color of light issuing past diaphragm 19. Such light may be focussed by lens 22 onto a viewing screen 25, and lightly outlined area 26 on screen 25 will be understood to designate the optical image of the effective transverse extent (i.e. normal to the axis 14) of the ultrasonic cell 15.

The shutter means 9 may be of any desired type, but for present purposes it should possess sufficiently fast action to expose the screen 25 for only a small fraction (say one percent, or less, depending upon desired resolution) of the transit time in the ultrasonic cell 15. In the form of Fig. 1, shutter means 9 comprises essentially an electro-optical mechanism 27, utilizing an electro-optical active crystal, such as ammonium-dihydrogen phosphate (ADP), laminated between transparent electrodes, and disposed between light polarizers in quadrature; a slit diaphragm 13' and collimating lenses 17'—18' may assure shutter action on parallel rays, as well as an efficient shutter-controlled illumination of slit 12. A delayed-action synchronizing-pulse amplifier 27' may adequately operate the shutter mechanism 27, and the delay in amplifier 27' should be such as to apply a shutter impulse at the instant when ultrasonic cell 15 contains a full signal, corresponding to its length in terms of the sonic-transit time across the cell 15; in other words, the synchronizing pulse to shutter 27 should occur at a particular instant of time (represented by cell length, divided by the velocity of sound) after commencement of application of the desired video signal to the cell crystal 16. In the type of organization just discussed, the ultrasonic cell 15 will be seen to function essentially as a delay-line means.

A simplified circuit 28 of a type which may be used to impress the amplitude and frequency modulations upon the crystal 16 is shown by way of example in Fig. 3. Such a circuit 28 may be of the "quadrature" variable-reactance type, in which the frequency of a tank circuit including an oscillator tube is electronically controlled by voltages impressed upon a variable-reactance circuit. In the circuit of Fig. 3, the tube 30 follows the varying amplitude of the amplitude-determining signal (A) impressed at input 29 to control the amplitude of oscillations in a tank circuit comprising capacitance 31 and inductance 32. The normal oscillating frequency may be selectably determined by manual adjustment at 32, as when adjusting a "center" frequency or color; and signal-controlled variations from this "center" frequency may be governed by variable-reactance tube 33. The frequency-determining signal (F) may be applied at input 34 to the control grid of tube 33; this grid is also fed from the output circuit of tube 33 through a phase-shifting resistor-reactance network 35—36, thereby causing tube 33 to produce amplified voltages substantially 90° out of phase with the voltage across the tank circuit. Since the output circuit of tube 33 is in shunt with the tank circuit 31—32, the instantaneous total reactance (and, therefore, the instantaneous frequency) of this circuit depends upon the amplification of the tube 33, and can therefore be controlled by the frequency-determining signal (F). The instantaneous amplitude and frequency of oscillations in tank circuit 31—32 may be inductively taken at 37 from inductance 31, for application to crystal 16.

Thus, summarizing, control signals (A) at input 29 modulate the amplitude of oscillations in tank-circuit 31—32, and thereby determine the relative brightness or intensity of light passing through the optical system of Fig. 1; at the same time, control signals (F) at input 34 modulate the frequency of oscillations in tank circuit 31—32, and thereby determine the instantaneous color of light passing through the optical system of Fig. 1. At any single instant of time, there may be a spatial distribution of such amplitude modulations and frequency modulations along the length of cell 15, and when instantaneously viewed, as under the action of shutter 27, the intensity and color distribution across the image area 26 will reflect the respective modulations; a scale may be inscribed across screen 25, as shown, in order to facilitate interpretation of the projected spatial-distribution data. It should be noted that the color modulation and the intensity modulation achieved by the above-described means may be effected practically instantaneously, i.e., with a time constant of the order of fractions of microseconds, depending upon the circuit parameters and the crystal carrier frequency N.

From Expressions 1 and 2 above, for any desired color, given the focal length $f$ of lens 18 and position of slit 21, the required carrier frequency N can be calculated. The following table shows, by way of example, for three colors (blue, green, red) the required frequencies N, under circumstances in which the focal length For many applications, it is desirable to have a means of shifting all color values within a certain range, either to accommodate to the color perception of the observer, or to obtain a matching with certain standard comparison colors. The disclosed arrangements lend themselves to the variable selection of color shift, in numerous ways, including the following:

(a) Selectively changing the average carrier frequency N, as by selectively varying the capacitor 32 in the tank circuit (see Fig. 3).

(b) Selectively shifting a collimating lens (18) across the optical axis 14 and generally parallel to the sound-propagating axis of cell 15, as indicated at 18' in Fig. 1.

(c) Selectively shifting the slits (21) of a diaphragm (19) along the spectra; in the case of several slits, this shift must be done symmetrically with respect to the center 20, and in proportion to the spectrum order number.

(d) Inserting a plane-parallel glass plate 69 between a collimating lens and a diaphgram, as near lens 18, between it and diaphragm 19, and selectively rotating this plate to produce inclinations thereof with respect to a plane transverse to the optical axis 14.

(e) Inserting between the ultrasonic cell and one of the collimating lenses an achromatic variable-angle prism of the type as used in range finders.

All the above or any other color-shifting means can be calibrated and read on a dial, as shown in the cases of indicators 18' and 69', so that any manually or otherwise selected shift may be used to indicate the variation of the color-determining factor, as will later appear.

The above discussion has shown that an ultrasonic signal-recording or display device can be utilized to represent independently a two-dimensional array of continuous variables, represented by continuous variation in intensity and color of the picture elements. Both variations can be controlled by two control voltages to be fed into the device, these voltages being applied in the same line when feeding a single cell (as the cell 15 of Fig. 1, Fig. 4A, or the cell 90 of Fig. 5, or in two separate lines when feeding separate cells as at 50—51 in Fig. 4). Many applications of this principle may be made, and I shall briefly describe a few radar applications. In each of these cases, the single network 28 is schematically shown to have a single output, as in the case of Figs. 1, 4A and 5, but it will be understood that separate amplitude-modulated and frequency-modulated outputs may be provided if one employs a multiple-cell system, as in Fig. 4.

In addition to or instead of using the variable echo intensity for varying the local intensities of the radar presentation, such variations may be used to vary local colors in the same presentation, as is possible with the described connections of Figs. 1 and 3. The normal radar-map presentations, whether PPI or strip maps, result from the varying echo intensities from the targets; in many cases, these echo intensities show great variation for different classes of targets, as between land and sea areas, between metallic and non-metallic targets, and particularly between air-borne targets, such as airplanes and missiles, and the sky background. In such cases, a vastly increased discrimination between targets may be obtained by utilizing the varying echo return intensities for controlling the color of the targets in the display.

The desired discrimination may be enhanced in the circuit of Fig. 6 by variously tapping the output of a network 66, which may be non-linear, carrying video signals from the radar receiver 65. As shown, the output of network 66 is a potentiometer 67, tapped at different voltage levels to provide the intensity-determining voltages (A) and the frequency (color)-determining voltages (F). Synchronizing pulses for shutter action may be supplied by the radar receiver at 68. With appropriate selection of the separate tapping levels on potentiometer 67 and/or predetermined non-linearity characteristics of the network, such discriminating effects as the following may be achieved: land areas may be shown in yellow, sea areas in blue; built-up areas may be shown in red, and rural areas in green; air-borne targets may be shown in yellow against a blue background. The actual colors in which the targets appear may be controlled and the correlation between echo intensities and colors adjusted in various ways, as by choosing different tapping points, or by employing one of several of the above-described electronic or mechanical color-shifting means.

In certain tactical and mapping or charting applications it is important unmistakably to identify a particular target, as in the case of aerial surveying in the field of known ground-based beacons, or in applying IFF techniques. Radar returns from such objects are coded or otherwise particularly characterized, so that by employment of suitably responsive decoding means 70 (Fig. 7) in the video output of the radar receiver, the video output may be admitted to the color-modulating line 34 if desired. With the described arrangement, it will be understood that gun-laying, tracking, and search radar may readily distinguish between friend and foe, even in close or confused formation or aircraft or ships, or possible ground vehicles, merely by observing the distinctive contrasting colors in the presentation.

In Fig. 8 I illustrate how my color-modulating means may be employed as an aid in discriminating the relative movement of targets. Echoes from variously moving targets will be characterized by correspondingly various Doppler effects; the Doppler return frequency may be directly transposed for frequency modulation of an ultrasonic cell, or, preferably, a discriminator 73, may feed the line 34 at the frequency-determining end of the network 28. With such an arrangement, not only is it possible to distinguish between moving and stationary targets, but particular colors may be correlated with particular moving-target radial velocities (i.e., with instantaneous velocity components in the direction of the radar beam). Thus, for example, stationary targets may be shown in green, approaching targets shifting in color toward the red end of the spectrum, and receding targets shifting toward the blue end of the spectrum, or vice versa, the more, the greater the relative velocity. This velocity may be directly measured by noting the particular extent of manual operation necessary to effect such a color change in the moving-target presentation that the moving-target color is reduced to that of a stationary-target standard; such manipulation may be made by one of the several mechanical and electronic methods which have been described, as by shifting the plane-parallel plate 69 and its indicator 69' against a scale (calibrated in velocity, if desired).

The moving-target color-discriminating means of Fig. 8 may have further utility as a means of selectively reducing or eliminating irregular "clutter," as may be caused by wind-blown leaves, "window"-reflector camouflage, and the like. By suitably rotating the plane-parallel plate 69, it will be seen that echoes due to such clutter may be shifted altogether out of the visible spectrum range, while the desired targets become defined with improved color and intensity contrast.

In application to height-finding radars, my invention may improve the ease of interpretation of the display by automatically color-modulating the received echoes in accordance with the altitude of detected targets; thus, targets at 5,000-ft. altitude or less may be displayed in red, at 15,000 feet in yellow, at 25,000 feet in green, and at 40,000 feet in blue. To this end, the amplitude modulating signal can be derived from an azimuth scan, and the frequency modulating, or color-determining signal, from an elevation scan; thus, a combined plan and height display will be obtained in which different colors can be correlated to different elevations. As an example, with reference to Fig. 9, the computed-elevation output $f$ of lens 18 is 15 inches (38.1 cm.), and the slit distance $d$ from the center position 20 is 2 millimeters:

| Color | Wavelength, (Angstrom units, A) | Frequency, N (Megacycles/sec.) |
|---|---|---|
| Blue | 4500 | 18.7 |
| Green | 5400 | 15.5 |
| Red | 6200 | 13.5 |

The slit width is determined by the desired color purity, and for most purposes a color band of a few hundred Angstrom units (A) will give sufficiently distinctive subjective color impressions. Thus, for instance, a slit width of 0.1 mm. will give color bands of from 200 to 300 A. in the first-order spectrum, depending upon the position in the spectrum.

The above table suggests that in order to cover the whole visible spectrum, a relatively wide frequency-modulation swing may be necessary; actually, the crystal-frequency variation is in proportion to the variation of the light frequency. Although the liquid medium in the ultra-sonic cell exerts sufficient damping upon the crystal to cover this frequency range, it may be desirable (in order to obtain a minimum variation of vibration amplitude, i.e., a flat response, over this range) to incorporate special band-widening means, either at the control circuit 28 or at the crystal. For instance, the frequency response of the crystal can be considerably widened by arranging additional matching and/or damping layers between the crystal surface and the liquid; alternatively, combined crystals, e.g., crystals formed by cementing together two or more crystals of slightly different resonance frequency, will result in coupled oscillations equivalent to a wide response. Such combined crystals may be replaced by multiple crystals arranged side by side or by a crystal of wedge shape, the thickness of which varies slightly, preferably in the direction of the optical axis 14; or the crystal can be loaded with varying masses, as, for instance, by covering its surface with a thin metal layer, varying slightly in thickness along the crystal surface. These are just some means of either electrically or mechanically flattening the overall frequency response of the system or adapting it to any particular desired shape depending upon the application.

Instead of using one slit opening 21, two such openings can be used at equal distances from the center position 20, as shown in Fig. 1. The figures of the above table are for the first-order spectra only, but since there will be also higher-order diffraction spectra, these can also be utilized, if desired, by arranging additional slit openings to intercept the higher-order spectra. Thus, the second-order spectra may contribute light by arranging openings of double width and at double the off-axis distance $d$, as compared with the offsets of the first-order openings 21; this will be clear from Fig. 2. It will be understood that the total light output can be considerably increased by employment of such multiple openings.

In accordance with a feature of the invention, ultrasonic color-modulation means of the character described may be used for radar recording and display, as well as in oscillographic and other applications employing time or otherwise-based sweeps; when so employed, the simultaneous presentation of two parameters on the same time base is found materially to aid interpretation. In the arrangement of Fig. 1, the video output of a radar receiver 38 may be fed by lines 29—34 to opposite ends of the circuit 28 for deriving amplitude and frequency-modulated signals for simultaneous application to the crystal 16. Synchronizing-pulse signals, as derived from the radar-transmission pulses may be fed in line 39 to amplifier 27' for appropriately delayed shutter actuation. The resulting presentation 26 on screen 25 will then be in effect a synchronized stroboscopic array of closely similar space-distribution patterns of lines of various intensities and colors. For example, assuming the scale on screen 25 to represent range, with the origin at the left (in the sense of Fig. 1), the first echo signal 40 may be a dull red, and thus represent a weak echo at relatively close range; at the same time another echo signal 41 may be a brighter green, thus representing a stronger echo at greater range. Any single presentation, may thus be characterized by a wide variety of colors and intensities.

In the alternative arrangement of Fig. 4, I employ two ultrasonic cells 50—51 in the optical system, one of the cells being used as a kind of focal-plane shutter, to effectively immobilize the wave trains in the other cell; circuit means 52 may accept input signals for translation into separate frequency-modulated (F) and amplitude-modulated (A) outputs based on the same or different carrier frequencies N, and in accordance with a feature of the invention, one of these outputs (frequency-modulated) may be applied to one cell (50) while the other output is applied to the other cell (51). The optical system may generally resemble that of Fig. 1, that is, light from a source 53 may be focussed by condenser 54 on the slit of a first diaphragm 55. Light passing diaphragm 55 may be collimated by lens 56 for passage through the first cell 50 and then focussed by lens 57 on the stop between diffraction slits of a second diaphragm 58. The ultrasonic waves of cell 50 are imaged upon cell 51 by lens 59 and collimated by lens 60, for passage through the second cell 51. Thereafter, the light may be focussed on the slit of a third diaphragm 61, and subsequently projected by a lens 62 onto a viewing screen or recording medium 63. In the form shown, shutter action is achieved in the first cell (50), as by supplying in line 64 synchronizing pulses derived from the repetition frequency of the radar, with a suitable delay as above explained. As thus arranged, the cell 50 will perform the dual functions of shutter action and of color modulation, while the cell 51 intensity-modulates the light passed by the cell 50, but it will be understood that the color-modulating action may also be caused to take place in cell 51 (in which case cell 51 performs the dual functions of intensity and color modulation), and that, if desired, the frequency modulation and the intensity modulation may be effected in the reversed order of cells (i.e. in cells 51—50, respectively). Further alternatively, it may in certain cases be advantageous to impress the frequency-modulated signals (i.e. to color-modulate) on both cells 50—51.

In the further alternative arrangement of Fig. 5, I employ a single ultrasonic cell 90, excited by a crystal 91 to which the output circuit 28 of Fig. 3 may simultaneously supply both amplitude-modulated (A) and frequency-modulated (F) signal components, based on the same carrier frequency N. The system of Fig. 5 may otherwise resemble that of Fig. 1, except for omission of the shutter means 9; corresponding parts have therefore been given the same reference numerals in the drawing. In Fig. 5, shutter action is replaced by immobilizing action, achieved by means of a rotating mirror polygon on a transverse axis perpendicular to the direction of sound propagation in cell 90, and continuously driven at a rate corresponding to the pulse-repetition or line frequency impressed at 91, divided by the number of mirror faces on prism 92; such synchronism with radar 38 is suggested at 94. The polygon 92 will be understood to produce effective immobilization of any video signals travelling in cell 90, so as to develop a continuously viewable display of these signals in the image of cell 90, projected on screen or film 93. As previously described, intensity and color modulation will characterize the display.

In Fig. 4A, there are illustrated modified electrical connections to the optical configuration of Fig. 4, and for this reason, parts have been identified with corresponding reference numerals. In Fig. 4A, preference is indicated for feeding one cell (51) with both the amplitude and frequency modulated signals, and for applying synchronizing pulses, as from line 39 of Fig. 1, to the other cell (50). The resultant action in the latter cell (50) is one of immobilization, as achieved by the rotating polygon of Fig. 5.

75 of a height-finding radar 76 may be caused to drive a potentiometer 77 across which a D.C. voltage is applied for appropriately setting the color-modulation input to circuit 28. The video output may be fed to the amplitude-modulation input to circuit 28. Synchronizing data for optical-shutter operation may be available from the radar at 79. In operation, it will be seen that color modulation of the display may be governed solely by the instantaneous position of the computed-elevation output of the radar.

In a further application of my invention, color modulation of the display may be caused to reflect instantaneous phase-shift phenomena; in radar applications, such use may provide a means of recognizing target surface or orientation characteristics from the color of a displayed target echo. To produce such indications I may employ the circuit of Fig. 10, which resembles the circuit of Fig. 8 except for the inclusion of phase-discriminating means 80. The phase-discriminating means 80 may feed the frequency (color)-determining end of circuit 28 with signals of varying amplitude, reflecting the instantaneous phase condition of received echoes, while the video output of the receiver is applied to the amplitude-determining end of circuit 28.

It will be appreciated that I have described improved means for the simultaneous display of a plurality of variables, in a manner providing effectively an increased dimension in the interpretability of the display. The incorporation of my invention involves little or no added complexity over that required for certain black-and-white displays. Furthermore, the described ultrasonic color-modulation method has the basic advantage (over other displays which rely solely on three particular colors) of offering an infinite and continuous gamut of colors, steadily varying from one spectral color to the next, throughout the whole spectrum; this fact inherently also permits adaptation of the method to objective color-discriminating systems of far higher color-resolving power than that of either the human eye or photographic color films.

While I have described my invention in detail for the preferred forms shown, it will be understood that modifications may be made within the scope of the claims which follow.

I claim:

1. In a radar, a receiver having a video output and a synchronizing output for a synchronized presentation of the video information, there being a fresh train of video signal for each transmission pulse and there being a synchronizing signal for each such train, ultrasonic-light-cell display means including a color-separating diaphragm for arresting the projection of all except a relatively small part of the light spectrum developed upon excitation of said ultrasonic cell means, shutter means for effectively immobilizing transients along said cell means, said shutter means being connected for operation by the synchronizing output of said receiver, continuously variable frequency-modulating means connected to said cell means, and means connecting the video output of said receiver to said frequency-modulating means.

2. A radar according to claim 1, in which amplitude-modulating means are provided for said cell means, said amplitude-modulating means being connected for operation in response to the video output of said receiver.

3. In a radar-display device of the character indicated, a source of light, ultrasonic-cell light-modulating means including optics and a diaphragm for projecting a colored image of said cell in accordance with the instantaneous excitation of said cell, continuously variable frequency-modulating and amplitude-modulating means for said cell, and means including a network for simultaneously supplying image-producing signals to said frequency-modulating and to said amplitude-modulating means.

4. A device according to claim 3, in which said network includes a voltage-divider output, and means for selectively independently connecting said frequency-modulating means and said amplitude-modulating means to separate points on said voltage-divider output.

5. A device according to claim 3, in which said network is non-linear.

6. In a radar, receiver means including decoding means responsive to a preselected pulse coding, ultrasonic-cell light-modulating color-display means including frequency-modulating means responsive to an operation of said decoding means, whereby signals effective to operate said decoding means may cause characteristic color modulations in said display.

7. In a radar, receiving means including a frequency discriminator responsive to carrier-frequency deviations in received pulses, display means including ultrasonic-cell color-modulating means, and frequency-modulating means for said cell means and connected for operation in response to the output of said discriminator.

8. A device according to claim 7, in which amplitude-modulating means are provided for said cell means and are connected for response to the video output of said receiver.

9. In a height-finding radar, receiving means including a video output and a computed-elevation output, means for modulating the video output with the computed-elevation output, frequency-modulating means driven by said modulated video output, and display means including ultrasonic-cell color-modulating means responsive to said frequency-modulating means.

10. In a radar, receiving means including a phase-discriminator responsive to phase displacements in the carrier frequency of received pulses, display means including ultrasonic-cell color-modulating means, and frequency-modulating means for said cell means and connected for operation in response to the output of said discriminator.

11. A device according to claim 3, in which said network is linear.

12. In a radar display device of the character indicated, delay-line means comprising ultrasonic-cell means, frequency-modulating and amplitude-modulating means for said delay-line means, means for instantaneously sampling a substantial part of said ultrasonic-cell means, and optics responsive to the action of said sampling means for optically displaying the instantaneously sampled information in said delay-line means.

13. In a radar, a receiver having a video output and a synchronizing output for a synchronized presentation of the video information, ultrasonic-light-cell display means including a color-separating diaphragm for arresting the projection of all except a relatively small part of the light spectrum developed upon excitation of said ultrasonic cell means, mirror means for effectively immobilizing transients along said cell means, means synchronized to the pulse-repetition frequency of said radar for driving said mirror in a rotary sweep about an axis substantially transverse to the propagation axis of the light reflected by said mirror means, and frequency-modulating means for said cell means and responsive to the video output of said receiver.

14. In a radar, a receiver having a video output and a synchronizing output for a synchronized presentation of the video information, ultrasonic-light-cell display means including a color-separating diaphragm for arresting the projection of all except a relatively small part of the light spectrum developed upon excitation of said ultrasonic cell means, a mirror polygonal prism mounted on a rotary axis generally transverse to the propagation axis of light reflected thereby, means for continuously rotating said prism and including a synchronizing connection with said radar, and continuously variable frequency-modulating means for said cell means and responsive to the video output of said receiver.

15. The radar of claim 14, in which the rate of rotation of said prism equals the pulse-repetition frequency of the radar divided by the number of reflecting sides of said prism.

16. In a radar, display means including a source of light, ultrasonic-cell light-modulating means including optics and a diaphragm for projecting a colored image of said cell; a network responsive to received radar data and including means for exciting said cell with a carrier frequency, and means continuously variably responsive to said data for frequency-modulating said carrier frequency.

References Cited in the file of this patent

UNITED STATES PATENTS

| | | |
|---|---|---|
| 2,508,358 | Ayres | May 23, 1950 |
| 2,513,520 | Rosenthal | July 4, 1950 |
| 2,597,636 | Hall et al. | May 20, 1952 |